(12) United States Patent
Gushwa et al.

(10) Patent No.: US 10,092,138 B2
(45) Date of Patent: Oct. 9, 2018

(54) MODIFIED DICING PROCEDURE FOR A FOOD PROCESSOR

(71) Applicant: WHIRLPOOL CORPORATION, Benton Harbor, MI (US)

(72) Inventors: David J. Gushwa, Mishawaka, IN (US); Jeffrey Carl Loebig, Hong Kong (CN); Yung Leong Hin, Hong Kong (CN); Fan Zhao, Guangdong (CN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/520,214

(22) PCT Filed: Dec. 24, 2014

(86) PCT No.: PCT/CN2014/094750
§ 371 (c)(1),
(2) Date: Apr. 19, 2017

(87) PCT Pub. No.: WO2016/101157
PCT Pub. Date: Jun. 30, 2016

(65) Prior Publication Data
US 2017/0311760 A1    Nov. 2, 2017

(51) Int. Cl.
*A47J 43/04* (2006.01)
*A47J 43/07* (2006.01)
(Continued)

(52) U.S. Cl.
CPC ........... *A47J 43/04* (2013.01); *A47J 43/0716* (2013.01); *B26D 1/03* (2013.01); *B26D 7/2614* (2013.01); *A47J 43/00* (2013.01); *B26D 1/00* (2013.01)

(58) Field of Classification Search
CPC ......... A47J 43/04; A47J 43/0716; B26D 1/03; B26D 1/00
See application file for complete search history.

(56) References Cited

U.S. PATENT DOCUMENTS 4,145,941 A * 3/1979 Davis ................... B26D 1/03
                                                   83/167
4,393,737 A * 7/1983 Shibata ................ B26D 3/22
                                                   241/282.2
(Continued)

FOREIGN PATENT DOCUMENTS

| CN | 202287942 U | 4/2012 |
| EP | 2130471 B1 | 7/2013 |
| WO | 2010012727 A1 | 2/2010 |

*Primary Examiner* — Sean Michalski
(74) *Attorney, Agent, or Firm* — Price Heneveld LLP (57) ABSTRACT

A food processing device (10) includes a drive assembly coupled to a dualaction cutting tool (20) and a single-action dicing tool (40). First and second cutting assemblies (51, 52) are disposed on the cutting tool (20) and are adapted to make first and second cuts in a food substrate as the cutting tool (20) rotates within a food processing path (26). The cutting tool (20) is further adapted to urge the cut food substrate towards and through the dicing tool (40) where generally parallel spaced-apart blades (66) further cut the food substrate to form diced food elements. The sequential cutting arrangement of the cutting tool (20) and the dicing tool (40) provides for a food processing device (10) that is capable of dicing a food substrate with lower torque and lower power requirements as compared to conventional dicing methods.

20 Claims, 5 Drawing Sheets

(51) Int. Cl.
    *B26D 7/26*     (2006.01)
    *B26D 1/03*     (2006.01)
    *B26D 1/00*     (2006.01)
    *A47J 43/00*     (2006.01)

(56) References Cited

U.S. PATENT DOCUMENTS

| | | | | |
|---|---|---|---|---|
| 4,560,111 | A * | 12/1985 | Cavalli | B26D 3/22 241/282.2 |
| 5,896,801 | A * | 4/1999 | Jacko | B26D 3/22 83/356.3 |
| 8,051,769 | B2 * | 11/2011 | Conti | A47J 43/0711 241/166 |
| 8,677,895 | B2 * | 3/2014 | Beber | A47J 43/0711 241/101.1 |
| 9,301,647 | B2 * | 4/2016 | Ekstrom | A47J 43/07 |
| 9,763,543 | B2 * | 9/2017 | Wang | A47J 43/0722 |
| 9,770,134 | B2 * | 9/2017 | Unteregger | B26D 3/22 |
| 2004/0060414 | A1 * | 4/2004 | Sundqvist | A47J 36/02 83/663 |
| 2009/0202694 | A1 * | 8/2009 | Julian | B26D 1/38 426/506 |
| 2011/0049279 | A1 * | 3/2011 | Beber | A47J 43/0716 241/88 |
| 2016/0101533 | A1 * | 4/2016 | Aramburo | B26D 3/11 241/101.4 |
| 2017/0311761 | A1 * | 11/2017 | Obersteiner | A47J 43/046 |

* cited by examiner

MODIFIED DICING PROCEDURE FOR A FOOD PROCESSOR

FIELD OF THE INVENTION

The device of the present disclosure relates to electrical appliances for processing food items, and more specifically, to an electrical food processing device having a modified dicing process which reduces the amount of power and associated torque necessary to dice various food substrates.

BACKGROUND

To provide sufficient power and torque in a food processing apparatus adapted for dicing food substrates, it is often necessary to increase the size or speed of the electric drive motor to increase the overall power output. Such increased power outputs not only require more energy consumption, but may also further increase noise and heat generation. Due to existing drive motor limitations, it remains difficult in practice to design a simple and efficient food processing machine that provides drive outputs working at their optimum speed and torque for the specific food preparation technique being undertaken.

Presently, commercial style dicing is defined as the process of dicing food in a certain manner. The standard method of dicing foods includes a horizontal slicing blade to first slice a food substrate, and then the food slices forced through a square grid of vertically facing cutting elements to create a cube. The mechanism to push the food through the grid is a generally a ramp located on the underside of the rotating slicing blade. Such dicing methods require a food processor with a high torque motor to properly power the food substrate through the resistance of the dicing grid.

Thus, a modified dicing process is desired, wherein the energy and torque requirements of the drive motor are reduced in preforming a multi-axis cutting operation.

SUMMARY

One aspect of the present invention includes a food processor having a receptacle configured to receive processed food. A feed tube is configured to receive a food substrate for processing and is in communication with the receptacle to at least partially define a food processing path from the feed tube to the receptacle. A cutting tool is adapted to rotate through the food processing path to cut the food substrate as it passes through the food processing path. The cutting tool includes first and second cutting assemblies adapted to make first and second cuts in the food substrate. The first and second cuts in the food substrate created by the cutting assemblies of the cutting tool are substantially perpendicular to one another. A dicing tool having a plurality of generally parallel dicing elements is disposed within the food processing path between the cutting tool and the receptacle. The dicing tool is adapted to make a single third cut in the food substrate to dice the food substrate after the food substrate has been cut by the cutting tool. The food processor of the present invention further includes a drive motor coupled to a drive shaft and an output drive disposed in the receptacle. The output shaft is operably coupled to the cutting tool to rotate the cutting tool through the food processing path.

Another aspect of the present invention includes a food processor having a food receptacle with an upwardly opening top portion terminating in a lip. In assembly, the food receptacle is configured to receive food as processed by the food processor. A lid is removably mounted on the food receptacle, such that the food receptacle and lid collectively define a food processing chamber. A feed tube upwardly extends from the lid and is in communication with the food processing chamber to at least partially define a food processing path from the feed tube to the food receptacle. A cutting tool is located within the food processing chamber and includes first and second cutting assemblies which are movable through the food processing path to cut a food substrate as it passes through the food processing path. A dicing tool is carried by either the food receptacle or the lid and includes a plurality of generally parallel spaced-apart blades disposed within the food processing path. In assembly, the blades are adapted to dice the food substrate as previously cut by the cutting tool.

In yet another aspect of the present invention, a method of dicing a food substrate includes the steps of providing a food processor having a feed tube and a food receptacle defining a food processing path, a drive motor adapted to power a drive shaft and output shaft, a cutting tool rotatably received on the output shaft having first and second cutting assemblies adapted to rotate through the food processing path and a dicing tool disposed below the cutting tool. The dicing tool includes a plurality of generally parallel spaced-apart blades disposed within the food processing path. The method further includes the steps of providing a food substrate in the food processing path and rotating the cutting tool along a rotational axis to make a first cut in the food substrate with the first cutting assembly, and to further make a second cut in the food substrate with the second cutting assembly. The second cut is substantially perpendicular to the first cut to form strips of food substrate. The method further includes the step of urging the strips of food substrate through the plurality of generally parallel spaced-apart blades of the dicing tool to form diced food elements.

These and other features, advantages, and objects of the present device will be further understood and appreciated by those skilled in the art by reference to the following specification, claims, and appended drawings.

DETAILED DESCRIPTION

Figure 1:
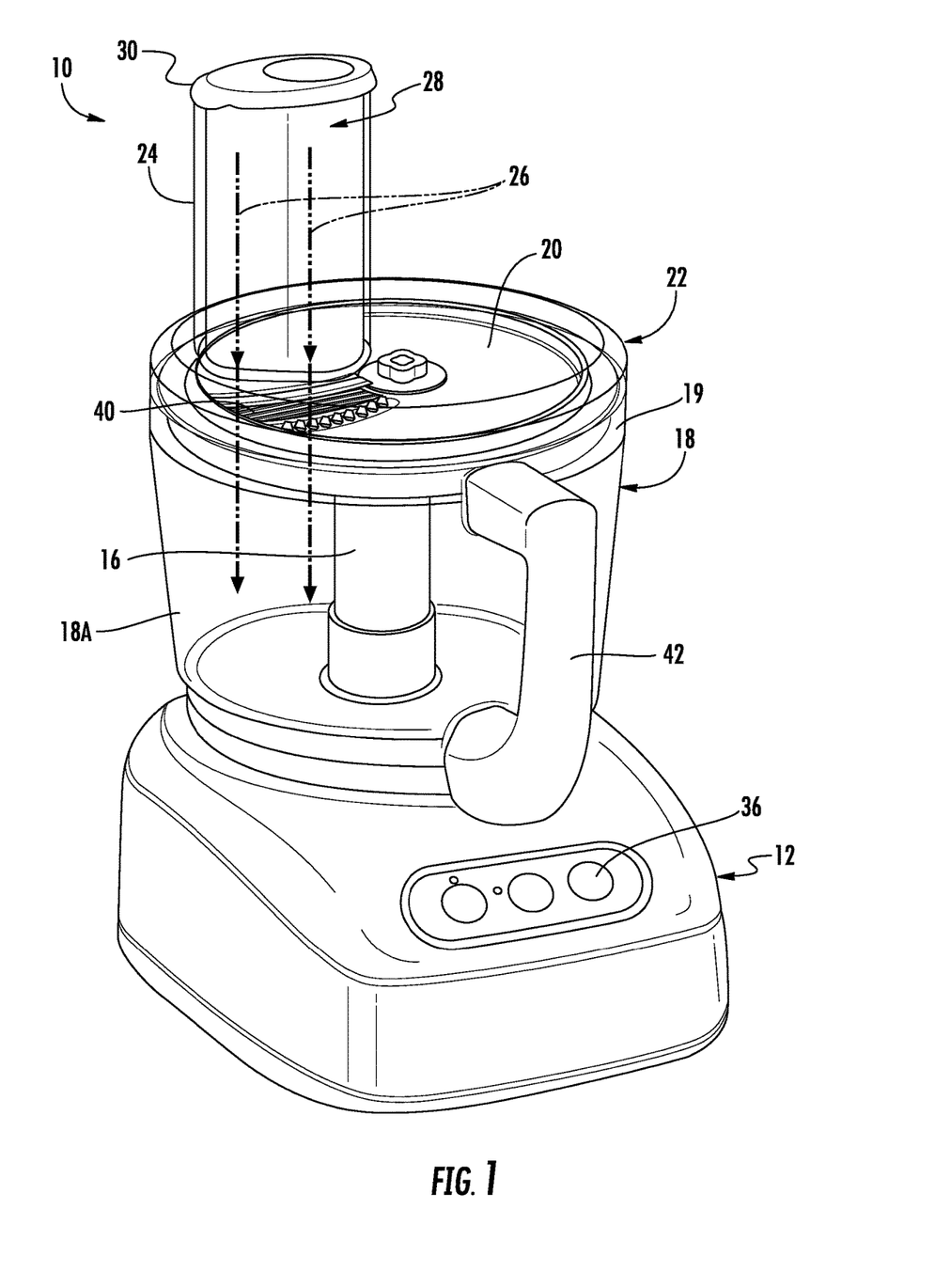
FIG. 1 is a perspective view of one embodiment of a food processing device of the present invention.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
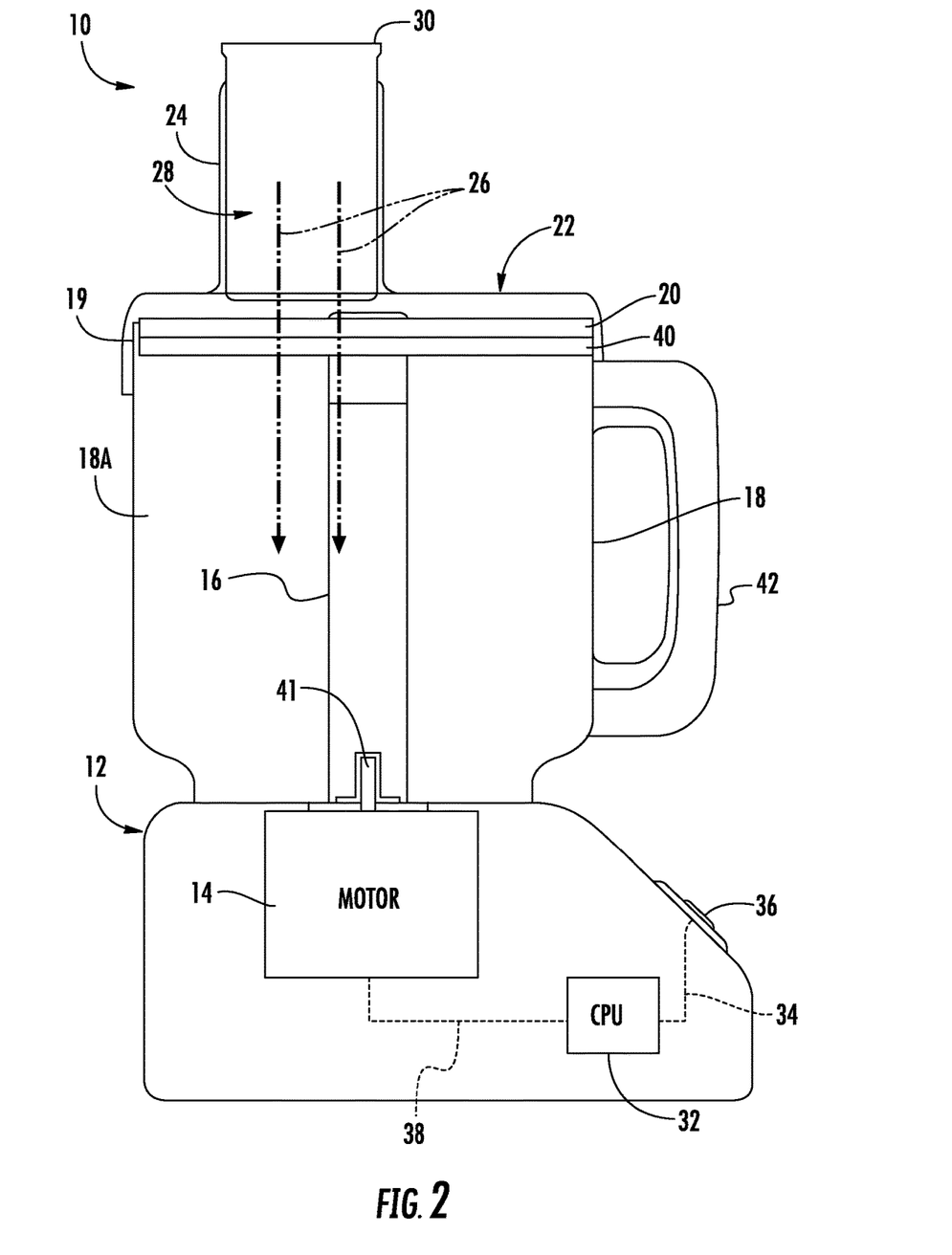
FIG. 2 is a side elevational view of the food processing device of FIG. 1 illustrating a food processing path through the food processor in relation to a cutting tool and a dicing tool.

Referring now FIG. 1, the reference numeral 10 generally indicates a food processor according to one embodiment of the invention. The food processor 10 shares many features of a conventional food processor, which will not be described in detail herein except as necessary for a complete understanding of the invention. The food processor 10 includes a base 12 having a motor 14 and an output shaft 16, as best shown in FIG. 2. A food receptacle or a bowl 18 for receiving the processed food is supported on the base 12 and is generally comprised of a transparent plastic material. The bowl 18 terminates in an upwardly opening top defined by a lip portion 19.

A removable lid 22 is removably secured on the bowl 18 by a snap-fit, a twist-lock arrangement, or any other suitable means of attachment. The lid 22, as secured to the bowl 18, serves to close the upwardly opening top portion of the bowl 18 at the lip portion 19. In this way, the bowl 18 and lid 22 collectively form a food processing chamber 18A. A feed tube 24 extends upwardly from the lid 22, and is adapted to slidably receive a food pusher 28 which is sized to slide through the feed tube 24 and used to push or urge food items through the feed tube 24 along a food processing path 26. A stop member 30 is disposed on an upper portion of the food pusher 28 and is adapted to abut an uppermost portion of the feed tube 24 to limit the insertion of the food pusher 28 into the feed tube 24. As noted above, the bowl 18 and lid 22 are generally comprised of a transparent plastic material, but such a transparent composition is not necessary for functioning within the spirit of the present invention.

The bowl 18, lid 22, and feed tube 24 may be collectively referred to as a housing into which a food substrate is introduced and processed. It is also possible for the base 12 to be a part of the housing, however, in the illustrated embodiment, the housing is supported from the base 12 by the coupling of the bowl 18 to the base 12, as described above.

As further shown in FIG. 1, a cutting tool 20 and a dicing tool 40 are disposed within the housing in a generally stacked formation, with the cutting tool 20 disposed above and adjacent to the dicing tool 40. In the embodiment shown in FIG. 1, the cutting tool 20 is coupled to and supported on the output shaft 16, while the dicing tool 40 is supported on the bowl 18, such as by press-fitting into the upwardly opening top portion of the bowl 18 at the lip 19. For the purposes of this description, the term "dicing" is used to refer to any process in which a food substrate is cut or divided into multiple individual components. Non-limiting examples of diced food products generally include cutting the food into cubes or other polyhedral or cylindrical shapes. In use, the food processor 10 of the present invention is adapted to process a given food substrate by cutting the food substrate using the cutting tool 20 in combination with the dicing tool 40, such that the processed food exhibits similar dimensions along all three x, y and z-axes. Alternatively, the food can be cut by the cutting tool 20 and dicing tool 40, such that at least one of the axial-dimensions is different from the other two dimensions.

Referring now to FIG. 2, the food processing path 26, illustrated by the dashed lines in FIGS. 1 and 2, extends through the housing. The feed tube 24, in assembly, forms an inlet to and part of the food processing path 26. As illustrated in FIG. 2, the lid 22 and feed tube 24 act together as a food guide or a food chute configured to receive a food substrate for processing. The food processing path 26 extends from the feed tube 24 through the cutting tool 20 and a portion of the dicing tool 40. The food processing path 26 ends when the processed food is deposited into the food processing chamber 18A of the bowl 18.

A control system may be provided for controlling the operation of the food processor 10. The control system, as illustrated in FIG. 2, includes a controller 32, which is electronically coupled through a user interface lead 34 to a user interface or control panel 36. In the embodiment shown in FIGS. 1 and 2, the control panel 36 is disposed on the base 12 and includes operational controls such as dials, lights, switches, buttons and display screens enabling a user to control the operation of the food processor 10. The motor 14 is also electronically coupled through a control lead 38 to the controller 32. The food processor 10 of the present invention may be preprogrammed with a number of different food processing options for selection by the user, such as "high" and "low" speed settings, and a "pulse" setting.

Figure 3:
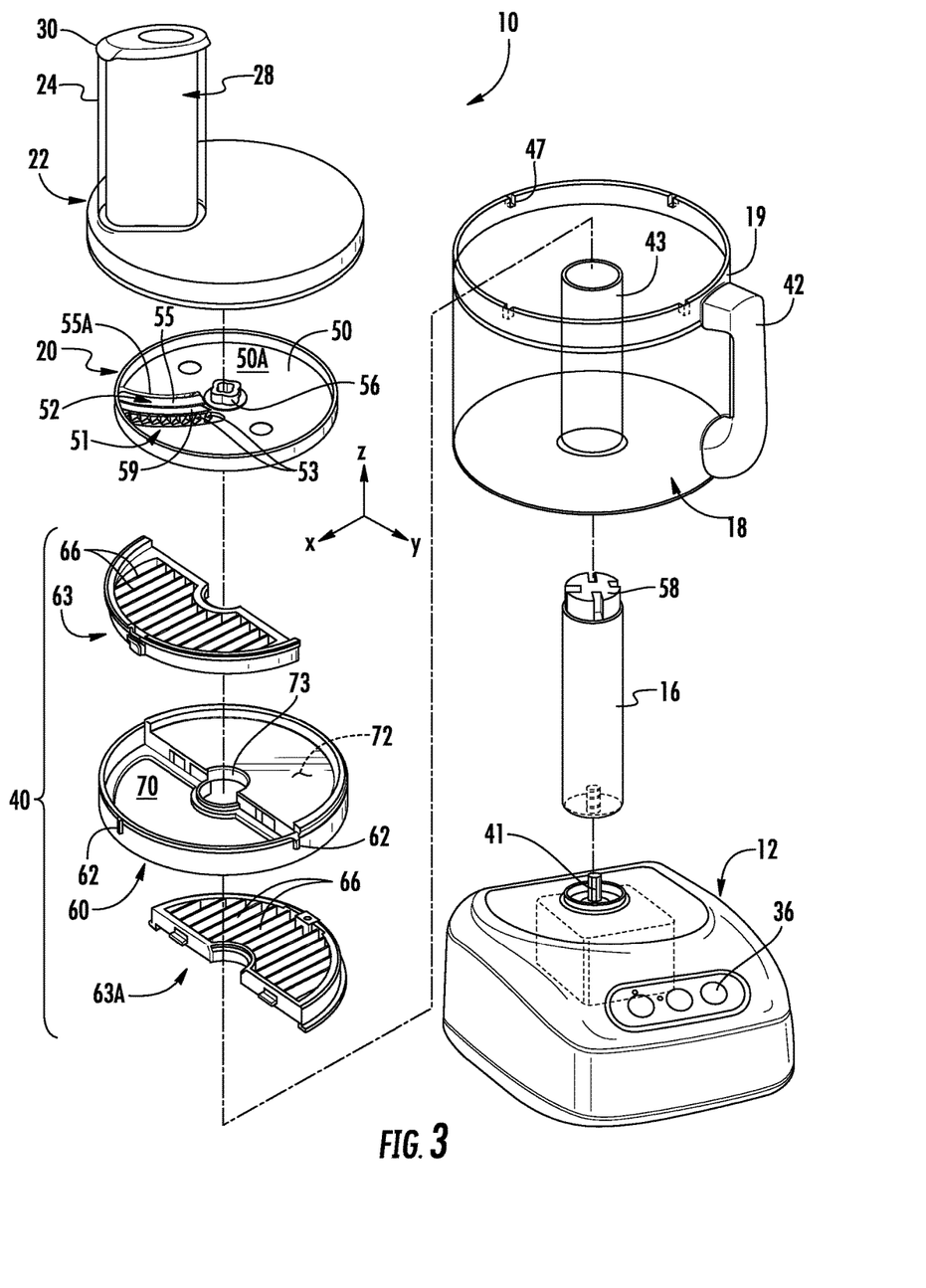
FIG. 3 is a an exploded view of the food processing device of FIG. 1.

Referring now to FIG. 3, the different elements of the food processor 10 will be described in greater detail. A drive shaft 41 extends from the base 12. The drive shaft 41 is operably coupled with the motor 14, and may be used to provide rotational movement to the output shaft 16 that extends into the food processing chamber 18A as defined by the boundaries of the bowl 18 and the lid 22. A handle 42 is provided on the bowl 18 so that a user may more easily maneuver the bowl 18. A guide 43 projects into the bowl 18, within which the output shaft 16 is received. The bowl 18 may be secured onto the base 12 and around the output shaft 16 by a snap-fit, a twist lock arrangement, or any other suitable means of attachment to properly secure the bowl 18 to the base 12 in preparation for a food processing procedure. As further shown in FIG. 3, the bowl 18 is provided with a plurality of keyways 47 disposed about the lip portion 19 of the bowl 18. In assembly, the keyways 47 provide securement locations for various cutting tools as further described below.

As used throughout this disclosure, the terms single-action and dual-action will refer to a tool used in the dicing process that is adapted to provide a single cut or a dual cut to a food substrate. It is contemplated that several cuts to a food substrate can be made by any one action of a tool used in the disclosed process, however, when the cuts provided by any given tool are configured in a single direction, such a tool will be referred to as a single-action tool. If the tool provides more than one directional cut, the tool will be referred to as a dual-action tool.

Figure 4:
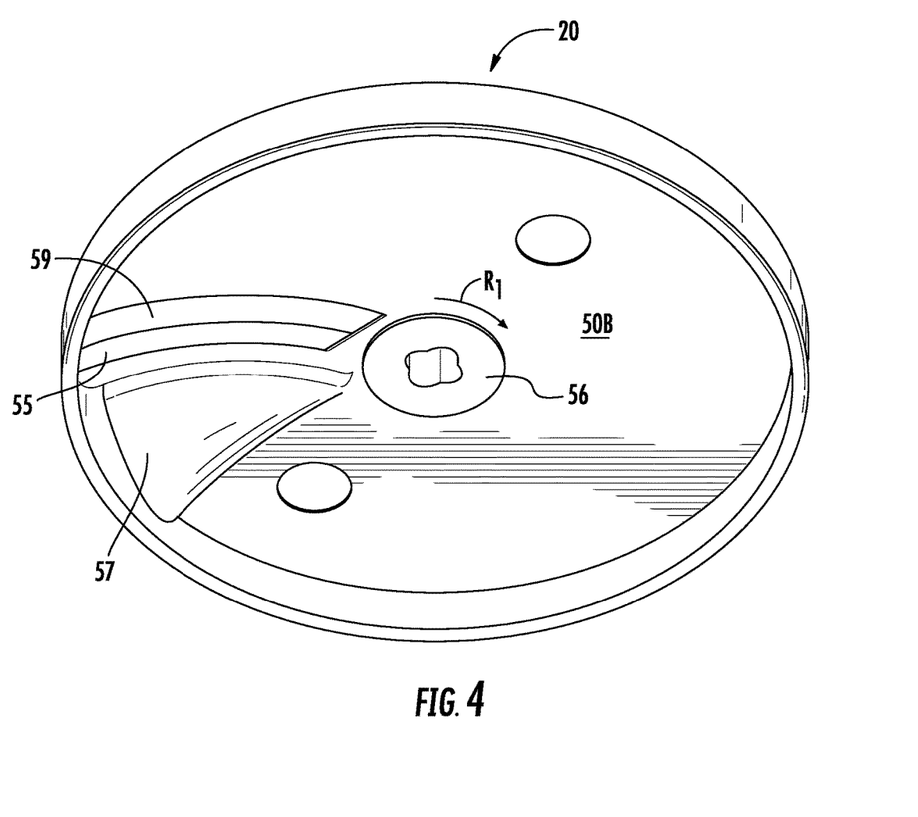
FIG. 4 is a bottom perspective view of the cutting tool of FIG. 3.

The cutting tool 20, as shown in FIGS. 3 and 4, is illustrated as being a rotatable cutting disc having a generally planar body portion 50 having an upper side 50A and an underside 50B. The cutting tool 20 of the present invention includes a first cutting assembly 51 having a plurality of vertically spaced-apart blades 53 which upwardly extend from a generally horizontal plate member 54 which is coupled to the upper side 50A of the planar body portion 50 of the cutting tool 20. In use, the vertical blades 53 are positioned to provide a first cut to a food substrate as the cutting tool 20 rotates in a direction as indicated by arrow $R_1$ through the food path 26. Thus, the first cutting assembly 51 is adapted to cut a food substrate along a generally vertical z-axis. As shown in FIGS. 3 and 4, the cutting tool 20 further includes a second cutting assembly 52 which is a generally straight and horizontal blade portion 55 that is spaced apart from the planar body portion 50 by a support member or riser 55A. The second cutting assembly 52 acts to provide a second cut to the food substrate subsequent to the cutting performed by the first cutting assembly 51. The second cut is generally a horizontal cut to the food substrate along an x-axis as the cutting tool 20 is rotated by the drive motor 14 (FIG. 2) through the food processing path 26. The second cut provides for a cut of a predetermined thickness as dictated by the spacing of the riser 55A from the planar body portion 50 of the cutting tool 20. It is contemplated that the spacing provided by the riser 55A may be from about 8-12 mm. Having this dual-action or dual cutting sequence provided by the first and second cutting assemblies 51, 52, the cutting tool 20 shapes the food substrate into long, thin strips, also known as julienne slices. Thus, the cutting tool 20 of the present invention is adapted to first cut a food substrate at a predetermined thickness using the vertical blades 53 of the first cutting assembly 51, and subsequently cut the food substrate using the horizontal blade portion 55 of the second cutting assembly 52. As such, the cutting tool 20 of the present invention is a dual-action cutting tool that makes two sequential cuts to the food substrate as the cutting tool 20 rotates in the direction as indicated by arrow $R_1$. After the first and second cuts are made in the food substrate to form strips, the strips of food substrate are guided through an aperture 59 (FIGS. 3 and 5A) disposed below the blade portion 55 of the second cutting assembly 52. Aperture 59 is disposed through the body portion 50 of the cutting tool 20, and opens into the dicing tool 40, thereby providing access thereto as further described below. The cutting tool 20 and cutting assemblies 51, 52 may be made of metal or any other suitable material for food processing.

In assembly, the cutting tool 20 may be operably coupled to the output shaft 16 above the dicing tool 40 by a mounting element, such as a hub 56, that is complementarily keyed to mate with an upper end 58 of the output shaft 16. In this way, the rotation of the output shaft 16 serves to rotate the cutting tool 20 through torque transferred from the drive motor 14, to the output shaft 16 and through the mounting element 56.

Referring again to FIG. 3, the dicing tool 40 includes a generally ring-shaped frame 60 having outwardly extending keyed elements 62 that are adapted to locate the dicing tool 40 within the bowl 18. The keyed elements 62 may be received by the keyways 47 in the lip portion 19 of the bowl 18 for securing the frame 60 to the bowl 18. More specifically, at least a portion of the frame 60 is press-fit against the lip 19. Alternatively, the dicing tool 40 may be mounted to the lid 22. As further shown in FIG. 3, one or more inserts 63, 63A, are removably supported by the frame 60 in assembly, each insert 63, 63A including a plurality of spaced-apart and generally parallel dicing elements 66, shown in FIG. 3 as upwardly extending parallel blades. As shown in FIG. 3, frame 60 includes a first compartment 70 and a second compartment 72, and a central portion 73 capable of receiving the output shaft 16. The central portion 73 is generally disposed between the first and second compartments 70, 72 and does not couple to the drive shaft 16, such that the dicing tool 40 remains stationary during a dicing procedure. In assembly, the inserts 63, 63A are adapted to be received in the first and second compartments 70, 72, with compartment 70 disposed in the food processing path 26. Thus, the inserts 63, 63A are interchangeable between compartments 70, 72 and it is contemplated that each insert 63, 63A will typically have different processing functionality, such as varied spacing of the dicing elements 66. Exemplary blade spacing for the dicing elements 66 of inserts 63, 63A may include 8-12 mm spaces to form 8-12 mm diced cubes in use.

Figure 5A:
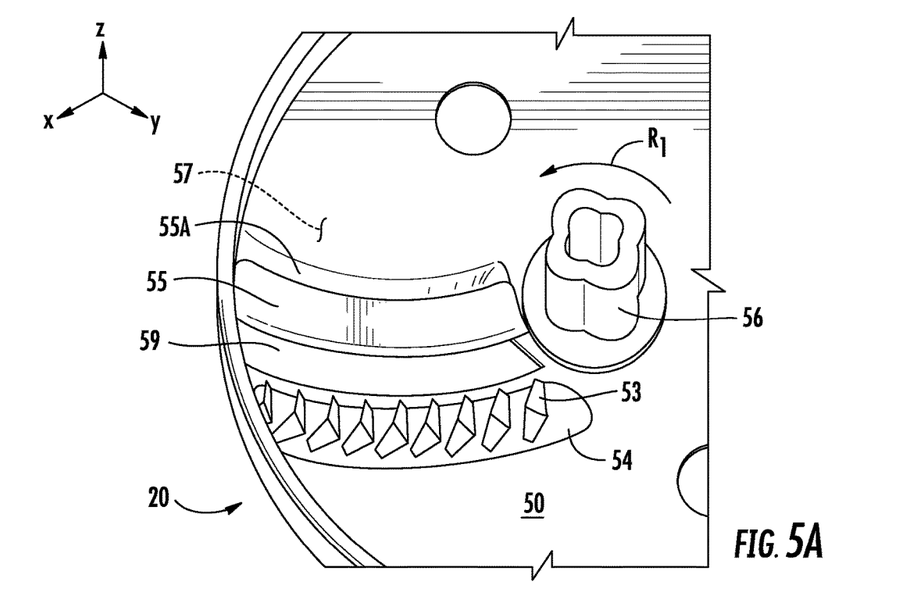
FIG. 5A is a fragmentary top perspective view of the cutting tool of FIG. 3.

As shown in FIGS. 4 and 5A, a ramped portion 57 slopes downwardly from the planar portion 50 on an underside 50B of the cutting tool 20. The ramped portion 57 acts to urge or push a food substrate that has been cut by the first and second cutting assemblies 51, 52 through the dicing elements or blades 66 of the dicing tool 40 (FIG. 3). It is further contemplated that the urging of the food substrate to the dicing tool 40 may be provided or assisted by the riser 55A alone, or in combination with the ramped portion 57. Referring again to FIG. 3, the dicing elements 66 are disposed in generally parallel and evenly spaced-apart arrangement and are further configured to be substantially perpendicular to the blade portion 55 of the second cutting assembly 52 and the blades 63 of the first cutting assembly 51 disposed on the cutting tool 20. In this way, the dicing tool 40 is a single-action dicing tool that is adapted to provide a single third cut to the strips of food substrate as they are urged through the dicing tool 40. The third cut provided by the dicing tool 40 by dicing elements 66 is generally a vertical cut to the strips of food substrate along a y-axis as the cutting tool 20 is rotated by the drive motor 14 (FIG. 2) through the food processing path 26. Thus, having the dual cutting sequence of the cutting tool 20 to form food strips followed by the third cut provided by the parallel blades 66 of the dicing tool 40, the food strips are cut at 90 degrees to the centerline of the food strips to produce cubes.

Having a unique combination of food processing elements, the present invention provides a more energy efficient method of dicing a food substrate, as compared to known dicing methods. In known dicing processes, a high-torque food processor is required in order to urge broad slices of a food substrate through a dicing tool having a cross-cut or grid-type configuration. Such a cross-cut style configuration includes dicing elements which essentially form square compartments through which the food substrate is urged by a ramped section of a single-action cutting tool that slices a food substrate into a single broad slice. Such a dicing process is disclosed in U.S. Pat. No. 8,250,959. In the present invention, the cutting tool 20 is a dual-action cutting tool that makes two cuts during a single rotation of the cutting tool 20 through the food processing path, such that the food substrate need only be cut one time by the parallel dicing elements 66 of the dicing tool 40 to provide a diced food substrate. Thus, the dicing tool 40 of the present invention, having parallel dicing elements 66, creates essentially 50% less resistance to a food substrate that is urged therethrough as compared to a grid-style dicing tool having perpendicular blades. In this way, the combination of the cutting tool 20 and the dicing tool 40 of the present invention require less energy and less torque from the motor 14 (FIG. 2) of the food processor 10. Thus, the present invention is adapted to conserve energy and provide for a modified dicing process which does not require a food processor having a high torque output for properly dicing a food substrate as further described below.

A load is increased on the food processor 10 of the present invention when a food substrate, received in the food path 26, encounters the first and second cutting assemblies 51, 52 of the cutting tool 20. A load is also realized as the food substrate is urged by the cutting tool 20 through the blades 66 of the dicing tool 40. Thus, as the blades 53 of first cutting assembly 51 pass into the food processing path 26 of the food processor, the blades 53 contact the unprocessed food substrate received therein. A resistive force acts on the cutting tool 20 due to the first-action of the blades 53 of first cutting assembly 51 cutting the food substrate as it rotates through the food processing path 26. Similarly, a resistive force acts on the cutting tool 20 due to the second-action of the blade portion 55 of the second cutting assembly 52 cutting the food substrate as it rotates through the food processing path 26. Finally, a resistive force is realized on the food processer 10 as the ramped portion 57 or riser 55A, either alone or in combination, acts on the cut food substrate to urge it against and through the parallel blades 66 of the dicing tool 40 to complete the dicing operation of the apparatus. Thus, the food processor 10 of the present invention must be provided with sufficient power and torque from the drive motor 14 (FIG. 2) to properly process the food substrate. The 3-cut process of the food processor 10 of the present invention provides for reduced power and torque requirements in use as compared to single-action slicing discs that urge food substrates through a cross-cut or grid-type dicing tool. It has been surprisingly discovered that even with the additional resistive forces realized by a dual-action cutting tool, such as cutting tool 20, as compared to a single-action cutting tool known in the art, an overall savings in energy consumption is realized when the dual-action cutting tool 20 is used with a single-action dicing tool, such as dicing tool 40 described above having parallel blades 66. Thus, the present invention, using a dual-action rotating cutting tool 20 with a single-action dicing tool, provides for an overall energy savings as compared to a dicing process using a single-action cutting tool and a dual-action grid-type dicing tool as further exemplified in the Examples and correlating Tables below.

EXAMPLE 1

Dicing Process Using Single-Action Cutting Disc and Grid-Type Dicing Tool

A 13 cup food processor having a 120V/60 Hz DC-motor was outfitted with a rotating single-action cutting disc and a stationary grid-type dicing tool for dicing various food substrates. The cutting disc and dicing tool were configured to provide an 8 mm diced food product. Various food substrates were processed continuously at various speed settings and the resulting current was recorded in Amps. The results of the testing for Example 1 are noted below in Table 1.

TABLE 1

| Food Substrate | Processor Speed | Current Average | Current Maximum |
|---|---|---|---|
| Carrots | Low | 22.0 A | 37.0 A |
| Carrots | High | 11.6 A | 22.4 A |
| Potatoes | Low | 8.3 A | 20.2 A |
| Potatoes | High | 9.1 A | 23.2 A |

EXAMPLE 2

Dicing Process Using Dual-Action Cutting Tool and Single-Action Dicing Tool

The food processor of Example 1 was outfitted with a rotating dual-action cutting tool and a stationary single-action dicing tool similar to cutting tool 20 and dicing tool 40 described above. The cutting tool and dicing tool were configured to provide an 8 mm diced food product. Various food substrates were processed continuously at various speed settings and the resulting current was recorded in Amps. The results of the testing for Example 2 are noted below in Table 2.

TABLE 2

| Food Substrate | Processor Speed | Current Average | Current Maximum |
|---|---|---|---|
| Carrots | Low | 4.3 A | 15.8 A |
| Carrots | High | 4.7 A | 10 A |
| Potatoes | Low | 4.5 A | 10.9 A |
| Potatoes | High | 2.9 A | 9.1 A |

A comparison of energy savings is noted below in Table 3 where the results of Examples 1 and 2 are compared.

TABLE 3

| Food Substrate and Processor Speed | Example 1 Current Ave-Max | Example 2 Current Ave-Max | Difference Current Ave-Max | Difference (%) Current Ave-Max |
|---|---|---|---|---|
| Carrots/Low | 22.0 A-37.0 A | 4.3 A-15.8 A | 17.7 A-21.2 A | 80.6%-57.3% |
| Carrots/High | 11.6 A-22.4 A | 4.7 A-10 A | 6.9 A-12.4 A | 59.5%-55.4% |
| Potatoes/Low | 8.3 A-20.2 A | 4.5 A-10.9 A | 3.8 A-9.3 A | 45.8%-46.0% |
| Potatoes/High | 9.1 A-23.2 A | 2.9 A-9.1 A | 6.2 A-14.1 A | 68.1%-60.8% |

Thus, as shown above, a food processor using the modified dicing method of the present invention is capable of realizing a 45.8%-80.6% reduction in current necessary to properly dice a food substrate. With the decreased energy requirements demonstrated above, the modified dicing method of the present invention is suitable for use with food processors having a low voltage built-in overcurrent protective device. In this way, the modified dicing process of the present invention can be used on a greater variety of food processing devices and will exhibit energy savings and cost savings in use. Further, the reduced torque and power requirements of the present dicing method equate to less wear on a food processor, thereby prolonging the useful life of the food processor.

Figure 5B:
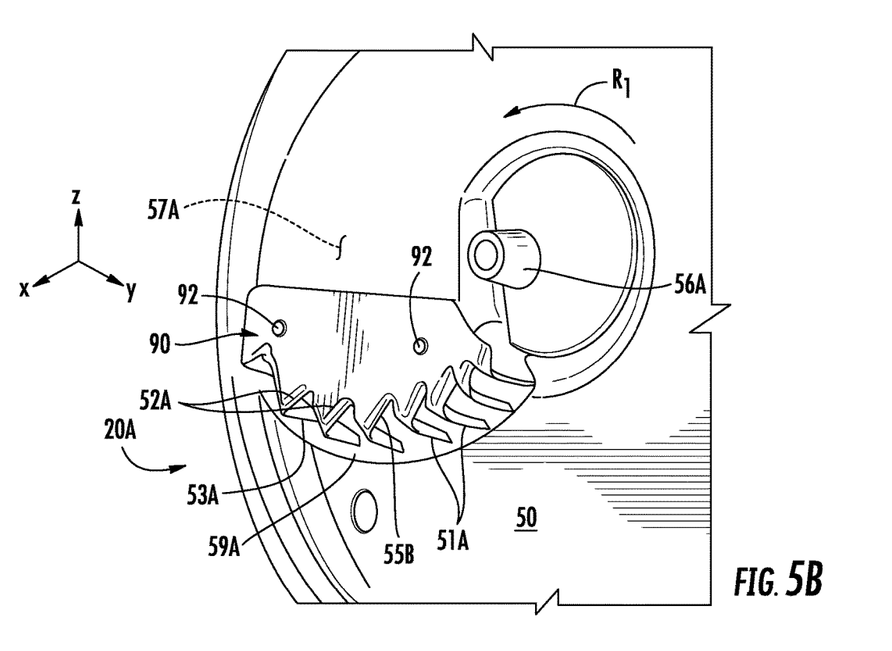
FIG. 5B is a fragmentary top perspective view of a cutting tool according to another embodiment of the present invention.

Referring now to FIG. 5B, a cutting tool 20A of another embodiment is shown and includes a hub 56A and a unitary member 90 having first and second cutting assemblies 51A and 52A supported thereon. In assembly, the unitary member 90 is spaced apart from a planar body portion 50A of the cutting tool 20A by supports 92, such that the unitary cutting member 90 is disposed above an aperture 59A that is adapted to open into a dicing tool. In this embodiment, the first and second cutting assemblies 51A, 52A are comprised from a single blade which is formed to include a plurality of vertical blades 53A and a plurality of horizontal blades 55B. In this way, the cutting tool 20A is a dual-action cutting tool adapted to provide first and second cuts to a food substrate. Thus, the cutting tool 20A is adapted for use with a single-action dicing tool, such as dicing tool 40 described above, for incorporation into the modified dicing process of the present invention.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processor comprising:
   a receptacle configured to receive processed food;
   a feed tube configured to receive a food substrate for processing and opening into the receptacle to at least partially define a food processing path from the feed tube to the receptacle;
   a cutting tool adapted to rotate through the food processing path to cut the food substrate as it passes through the food processing path, the cutting tool including first and second cutting assemblies adapted to make first and second cuts in the food substrate, wherein the first and second cuts are substantially perpendicular to one another;
   a dicing tool having a plurality of generally parallel spaced-apart dicing elements disposed within the food processing path, wherein the dicing tool is disposed between the cutting tool and the receptacle, and adapted to make a single third cut in the food substrate to dice the food substrate cut by the cutting tool; and
   a drive motor coupled to an output shaft disposed through the receptacle, the output shaft operably coupled to the cutting tool to rotate the cutting tool through the food processing path.

2. The food processor of claim 1, wherein the cutting tool is a cutting disc having a generally planar body portion, and further wherein the first cutting assembly includes a plurality of spaced-apart blades upwardly extending from the planar body portion.

3. The food processor of claim 2, wherein the second cutting assembly includes a blade portion disposed on a riser, wherein the riser supports the blade portion at a predetermined distance above the planar body portion.

4. The food processor of claim 3, wherein an underside of the riser urges the food substrate towards and through the dicing tool as the cutting tool rotates along a rotational path.

5. The food processor of claim 3, including:
   a ramped portion disposed on an underside of the planar body portion of the cutting tool, the ramped portion adapted to urge the food substrate towards and through the dicing tool as the cutting tool rotates along a rotational path.

6. The food processor of claim 5, wherein the second cutting assembly is positioned between the first cutting assembly and the ramped portion of the cutting tool along the rotational path of the cutting tool.

7. The food processor of claim 1, wherein the dicing tool includes a frame member, and further includes one or more inserts removeably received in the frame member, wherein the one or more inserts include the plurality of generally parallel dicing elements.

8. The food processor of claim 1, wherein the first cutting assembly of the cutting tool is configured to cut the food substrate along a first axis, and further wherein the second cutting assembly is configured to cut the food substrate along a second axis that is substantially perpendicular to the first axis.

9. The food processor of claim 8, wherein the plurality of dicing elements are adapted to cut the food substrate along a third axis that is substantially perpendicular to the first axis and the second axis.

10. A food processor comprising:
    a food receptacle configured to receive processed food and having an upwardly opening top portion;

a lid removeably mounted to the food receptacle, the food receptacle and lid collectively enclosing a food processing chamber;

a feed tube upwardly extending from the lid and in communication with the food processing chamber to at least partially define a food processing path from the feed tube to the food receptacle;

a cutting tool positioned within the food processing chamber, the cutting tool including first and second cutting assemblies that are movable through the food processing path to cut a food substrate as the food substrate passes through the food processing path; and a dicing tool supported by at least one of the food receptacle and the lid, the dicing tool including a plurality of generally parallel spaced-apart blades disposed along the food processing path to dice the food substrate after the food substrate is cut by the cutting tool.

11. The food processor of claim 10, wherein the cutting tool is a cutting disc having a generally planar body portion, and further wherein the first cutting assembly includes a plurality of spaced-apart blades upwardly extending from the planar body portion.

12. The food processor of claim 11, wherein the second cutting assembly includes a blade portion disposed on a riser, the riser adapted to support the blade portion at a predetermined distance above the planar body portion.

13. The food processor of claim 12, including:

a ramped portion disposed on an underside of the planar body portion of the cutting tool, the ramped portion adapted to urge the food substrate towards and through the blades of the dicing tool as the cutting tool rotates along a rotational path.

14. The food processor of claim 13, wherein the first cutting assembly is adapted to cut the food substrate along a generally vertical first axis, and further wherein the second cutting assembly is adapted to cut the food substrate along a generally horizontal second axis to form strips from the food substrate.

15. The food processor of claim 14, wherein the plurality of generally parallel spaced-apart blades of the dicing tool is adapted to cut the strips of food substrate along a generally vertical third axis that is perpendicular to the generally vertical first axis of the first cutting assembly.

16. The food processor of claim 15, including:

a food pusher sized to be slideably received in the feed tube to urge the food substrate along the food processing path.

17. A method of dicing a food substrate comprising the steps of:

providing a food processor, the food processor comprising:

a feed tube and a food receptacle cooperating to define a food processing path;

a drive motor having a drive shaft coupled to an output shaft;

a cutting tool coupled to the output shaft for rotation therewith, the cutting tool having first and second cutting assemblies positioned to rotate through the food processing path; and a stationary dicing tool disposed below the cutting tool, the dicing tool having a plurality of generally parallel spaced-apart blades disposed within the food processing path;

introducing a food substrate into the food processing path through the feed tube;

rotating the cutting tool along a rotational path;

cutting the food substrate with the first cutting assembly of the cutting tool as the cutting tool rotates along the rotational path to define a first cut in the food substrate;

cutting the food substrate with the second cutting assembly of the cutting tool as the cutting tool rotates along the rotational path to define a second cut in the food substrate, wherein the second cut is substantially perpendicular to the first cut, thereby forming strips of food substrate; and urging the strips of food substrate through the plurality of generally parallel spaced-apart blades of the dicing tool to form diced food elements.

18. The method of claim 17, wherein the step of urging the strips of food substrate through the plurality of generally parallel spaced-apart blades of the dicing tool further includes, urging the strips of food substrate with a ramped portion disposed on an underside of the cutting tool.

19. The method of claim 17, wherein the step of urging the strips of food substrate through the plurality of generally parallel spaced-apart blades defines a third cut to the strips of food substrate that is perpendicular to both the first cut and the second cut.

20. The method of claim 17, further including the step of:

receiving the diced food elements in the food receptacle.

* * * * *